(12) United States Patent
Nishimori et al.

(10) Patent No.: US 7,289,390 B2
(45) Date of Patent: Oct. 30, 2007

(54) ULTRASONIC TRANSMITTING/RECEIVING APPARATUS AND SCANNING SONAR EMPLOYING SAME

(75) Inventors: Yasushi Nishimori, Nishinomiya (JP); Minoru Handa, Nishinomiya (JP); Shiroh Ozasa, Nishinomiya (JP)

(73) Assignee: Furuno Electric Company, Limited, Hyogo-Ken (JP)

( * ) Notice: Subject to any disclaimer, the term of this patent is extended or adjusted under 35 U.S.C. 154(b) by 350 days.

(21) Appl. No.: 10/893,228

(22) Filed: Jul. 19, 2004

(65) Prior Publication Data

US 2006/0013066 A1  Jan. 19, 2006

(51) Int. Cl.
*G01S 15/00* (2006.01)
*A61B 8/00* (2006.01)

(52) U.S. Cl. .................. 367/103; 367/105; 600/437
(58) Field of Classification Search ............ 600/437, 600/443; 367/103, 105, 119, 122, 123
See application file for complete search history.

(56) References Cited

U.S. PATENT DOCUMENTS 5,608,690 A * 3/1997 Hossack et al. ............ 367/138
5,906,580 A * 5/1999 Kline-Schoder et al. .... 600/437
6,045,505 A * 4/2000 Holley et al. ............... 600/441
6,461,303 B2 * 10/2002 Angelsen .................... 600/458

FOREIGN PATENT DOCUMENTS

| JP | 61-151487 |   | 7/1986 |
| JP | 63-120270 | A | 5/1988 |
| JP | 3-118880  | A | 5/1991 |
| JP | 6-102350  | A | 4/1994 |
| JP | 7-5257    | A | 1/1995 |
| JP | 07-035847 |   | 2/1995 |
| JP | 09-243733 |   | 9/1997 |
| JP | 11-211823 | A | 8/1999 |

* cited by examiner

*Primary Examiner*—Ian J. Lobo
(74) *Attorney, Agent, or Firm*—Birch, Stewart, Kolasch & Birch, LLP

(57) ABSTRACT

An ultrasonic apparatus is disclosed that includes a transducer having a plurality of transducer elements, a controller operatively connected to the transducer and driving the transducer elements to produce a first ultrasonic transmitting beam having a first frequency and a second ultrasonic transmitting beam having a second frequency; and a processor operatively connected to said transducer for forming and moving reception beams to receive echo signals and extracting frequency components corresponding to said first ultrasonic transmitting beam and said second ultrasonic transmitting beam.

7 Claims, 11 Drawing Sheets

ULTRASONIC TRANSMITTING/RECEIVING APPARATUS AND SCANNING SONAR EMPLOYING SAME

FIELD OF THE INVENTION

This invention relates to an ultrasonic transmitting/receiving apparatus and a scanning sonar for detecting underwater objects by transmitting/receiving ultrasonic waves.

BACKGROUND OF THE INVENTION

A scanning sonar has been used for detecting underwater objects. The scanning sonar includes an approximate cylindrical transducer to detect an object in all directions around the transducer as shown in FIG. 1. Each vibrator of the transducer is driven to form an ultrasonic transmitting beam in all directions therearound. Signals for driving each of transducer elements (vibrator) are controlled to provide a transducer element array in each row with an appropriate delay time or phase difference so that a transmitting beam, which has specific umbrella type tilt angle keeping a directivity in vertical direction being within the specific angle, can be formed. A detection over all directions can be made by turning a direction of a receiving beam sequentially by switching over a combination of specific number of transducer element arrays disposed cylindrically which forms receiving beam in a specific direction.

In a conventional scanning sonar, there are a horizontal mode where a detection with a specific tilt angle is made in all surrounding directions and a vertical mode where a detection with a larger tilt angle is made for searching a sector-form cross section in a vertical direction. The horizontal mode is mainly used for detecting objects within a specific range around the boat. The vertical mode is mainly used for detecting objects locating within an area with specific width approximately directly below the boat.

Normally either the horizontal mode or the vertical mode is chosen according to the purpose of detection. In some cases, however, detecting objects both within a specific range around the boat and within an area with specific width approximately directly below the boat is desired at the same time. For that purpose, there is a horizontal-vertical multiple mode which displays detected two images from both the horizontal mode and the vertical mode on a single screen.

In the detecting method using a conventional scanning sonar, detected image of specific cross section is formed by transmitting an ultrasonic pulse of a single frequency toward the area to be detected and receiving the pulse reflected from the object and others sequentially at every specific direction. Consequently a control of forming both transmitting beam and receiving beam for the horizontal mode for obtaining the detected image in horizontal mode, and a control of forming both transmitting beam and receiving beam for the vertical mode for obtaining the detected image in vertical mode must be performed in turn.

This causes to make it slow to renew the detected image, in other words images which shows quick change cannot be detected. Also when the two detected images from the horizontal mode and the vertical mode are displayed on the same screen, the time those two images are detected is different (neither the same nor close to each other), which leads to difficulty in reading and understanding the relation therebetween while comparing the two images.

The problem described above arises not only in the above case, but also in the case where both objects in lateral direction, i.e. direction horizontal or direction tilted from horizontal by specific angle and objects in longitudinal direction, i.e. direction vertical or direction tilted from vertical by specific angle are tried to be detected in the same time or within a short period of time.

It is also important to avoid interference between two kinds of received signals when transmitting/receiving ultrasonic signal for detecting objects and receiving ultrasonic signal which has been transmitted for another purpose are performed concurrently. For example, at the time of transmitting/receiving ultrasonic signal for fish-finding or tidal current measuring, detecting operation as a scanning sonar is temporally suspended. This makes, however, the detecting operation intermittent and it difficult to perform detection in a short time period.

SUMMARY OF THE INVENTION

Embodiments of the present invention make it possible to perform a detecting operation by transmitting/receiving ultrasonic signal in lateral direction or longitudinal direction in a short time period. Another embodiment of the present invention provides an ultrasonic transmitting/receiving apparatus and a scanning sonar which are capable of avoiding an interference caused by a receiving signal other than an intended receiving signal.

An ultrasonic transmitting/receiving apparatus for detecting objects in lateral direction or longitudinal direction comprising: a transducer having a plurality of transducer elements; a transmitting beam former for forming ultrasonic transmitting beams in a plurality of directions in lateral direction or in longitudinal direction by driving a plurality of groups of transducer elements respectively; and a receiving beam former for forming and moving a receiving beam by controlling a signal received by a plurality of transducer elements for each of the transmitting beams; wherein the transmitting beam former forms transmitting beams of different transmitting frequencies by driving the transducer elements with detection signals having different frequencies respectively; and the receiving beam former extracts frequency components corresponding to the transmitting frequencies of the transmitting beams respectively as received signals.

Thus the transmitting beams are formed simultaneously in a plurality of directions by using a single transducer. Even when ultrasonic transmitting beams are formed simultaneously in a plurality of directions, the reflected signals from the plurality of directions such as lateral direction and longitudinal direction can be received simultaneously without any interference since frequency of each signal in each direction is different to each other and frequency components corresponding to the frequency of transmitting signal is extracted from the received signal.

An ultrasonic transmitting/receiving apparatus is disclosed wherein the transmitting beam former forms transmitting beams by transmitting signals with different frequency at the same time at every transmitting beam. This leads to reducing duration of transmitting beam formation, the duration is the same as in the case of forming transmitting beam in a single direction, and detection can be performed at short time intervals.

In an ultrasonic transmitting/receiving apparatus according to an embodiment of the invention, the transmitting beam former forms transmitting beams by time-sharing during transmitting beam formation, and receiving beam forming means extracts a received signal during receiving beam formation following the duration of transmitting beam formation. Transmitting beams are formed sequentially in a plurality of directions such as in lateral direction and longitudinal direction and the received signal from each directions is extracted in a subsequent duration of receiving beam formation following the duration of transmitting beam formation. Therefore detecting time interval remains the same or detections in a plurality of directions (lateral direction and longitudinal direction) is performed at short time intervals. And yet each transducer element is driven by a single frequency signal, which saves transmitting power and enable detection to reach farther place.

In an embodiment of the invention, the transmitting beam forming means includes means for generating a pulse-duration modulation signal for a waveform of driving signal provided to the transducer element, and means for driving the transducer element by converting the pulse-duration modulation signal into analog signal and amplifying; and the receiving beam forming means includes means for amplifying a received signal received by the transducer element and converting the amplified received signal into digital signal, means for performing a phase control calculation to determine the direction of receiving beam, and means for performing a filter calculation to extract components of the transmitting frequency.

Therefore the data transmission to the driving circuit attached to every transducer element becomes easy and noise affection can be reduced. Also digital signal is obtained for every received signal of each transducer element, which leads to easy transmission of received signal of the each transducer element to a processing part, and yet the phase control and filtering is performed through digital calculation, which allows for easier noise reduction.

An embodiment of the invention further comprises an ultrasonic transmitting/receiving apparatus for detecting objects in lateral direction or longitudinal direction comprising: a transducer having a plurality of transducer elements; a transmitting beam former for forming ultrasonic transmitting beams in a plurality of directions in lateral direction or in longitudinal direction by driving a plurality of transducer elements; and a receiving beam former for forming and moving a receiving beam by controlling a signal received by the plurality of transducer elements for each transmitting beam; wherein the transducer comprises a cylindrical or spherical surface on which the transducer elements are arranged, the transmitting beam former includes means for generating a pulse-duration modulation signal for a waveform of driving signal provided to the transducer element, and means for driving the transducer element by converting the pulse-duration modulation signal into analog signal and amplifying; the transmitting beam former forms transmitting beams of specific transmitting frequency at every transmitting beam by driving the transducer elements with detection signals having different frequencies respectively; the receiving beam former includes means for amplifying a received signal received by the transducer element and converting the amplified received signal into digital signal, means for performing a phase control calculation to determine the direction of receiving beam, and means for performing a filter calculation to extract components of the transmitting frequency.

Detected image is displayed by that a direction to be detected in the transmitting beam is sequentially scanned by controlling transmitting control means and receiving control means of the ultrasonic transmitting/receiving apparatus, and the detected image data in the detecting area is obtained based on the received signal in each direction and displayed.

BRIEF DESCRIPTION OF THE DRAWINGS

These and other benefits will become apparent from a reading of the following detailed description in connection with the following drawings, wherein.

DETAILED DESCRIPTION

Figure 1:
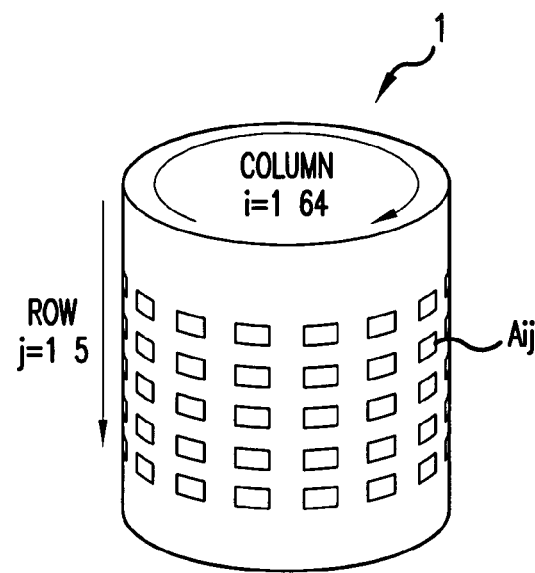
FIG. 1 is a schematic diagram of a transducer used for the scanning sonar.

A scanning sonar of the invention is described referring to the drawings which are intended to illustrate embodiments of the invention only and not to limit same. FIG. 1 is a schematic diagram of a transducer used for the scanning sonar. As shown in FIG. 1, a transducer 1 is constituted by 320 transducer elements $A_{ij}$ (i=1 to 64, j=1 to 5) consisting of 5 rows and 64 columns. The transducer 1 is mounted on the bottom of a boat so that the axis of the cylinder is vertical.

Figure 2A:
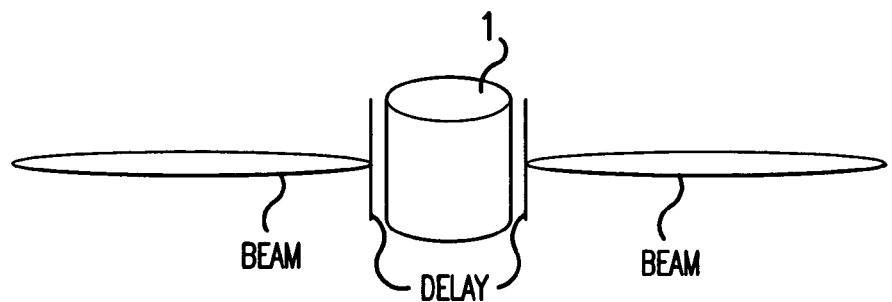
FIGS. 2a and 2b are explanatory diagrams of a transmitting beam.
Figure 2B:
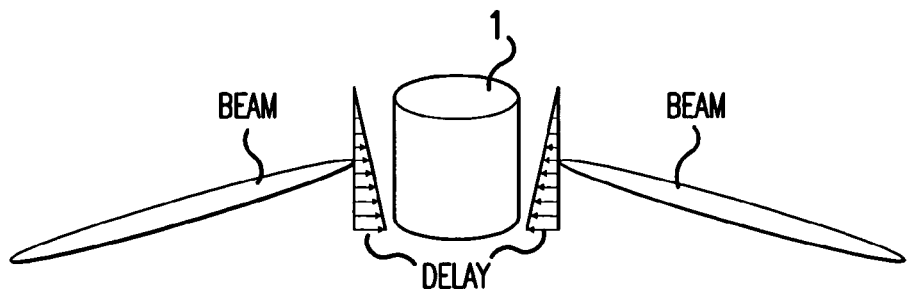
Figure 3A:
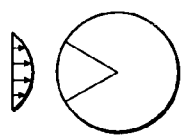
FIGS. 3a-3f show various receiving beams.
Figure 3B:
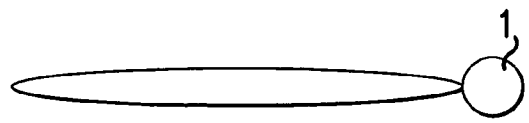
Figure 3C:
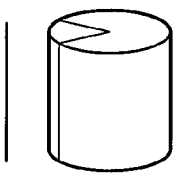
Figure 3D:
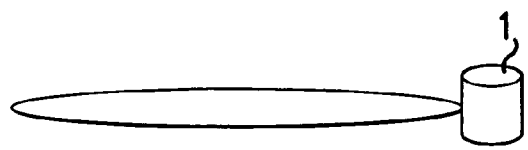
Figure 3E:
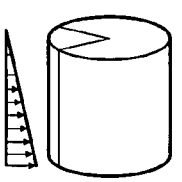
Figure 3F:
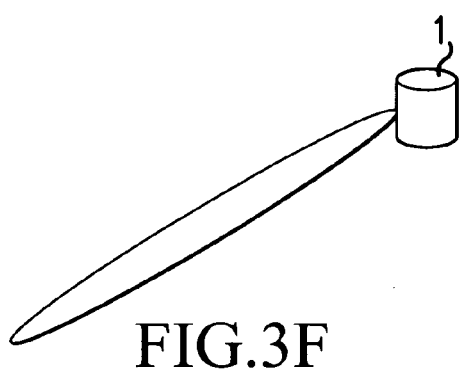

FIG. 2 is an explanatory diagram of a transmitting beam. FIG. 2(A) shows a directivity of a transmitting beam formed when the scanning detection is performed in all directions (in full circle) in a horizontal plane. FIG. 2(B) shows a transmitting beam formed when the scanning detection is performed in all directions (in full circle) at a specific tilt angle. The transmitting beam can be tilted downwardly by a specific angle to form an umbrella type beam by providing the greater delay time to the lower positioned transducer element of the transducer 1 when each transducer element is driven.

FIG. 3 shows a receiving beam. Transducer elements of a plurality of columns (vertical arrays) consecutive in the circumferential direction are used for a receiving beam. When summing/combining the signals received by the transducer elements of the plurality of columns, the greater phase delay is provided to the signal received by the transducer element which is located closest to the center position of the plurality of columns, as shown in FIG. 3 (A). This can make the directivity in horizontal plane sharper as shown in FIG. 3 (B). When the specific delay time is set in the direction of rows of transducer 1, a tilt angle can be controlled and a directivity in vertical plane becomes sharper, which leads to formation of so-called pencil-type receiving beam. FIG. 3 (C) shows an example where the delay time is constant, which leads to spread of receiving beam in horizontal plane as shown in FIG. 3(D). FIG. 3(E) shows an example where the greater delay time is provided to the signal received by the lower positioned transducer element, which leads to the receiving beam tilted downwardly as shown in FIG. 3(F).

As described above, an umbrella type area is detected by forming an umbrella type transmitting beam and receiving a specific directional signal in the transmitting beam through so-called pencil type receiving beam.

Figure 4:
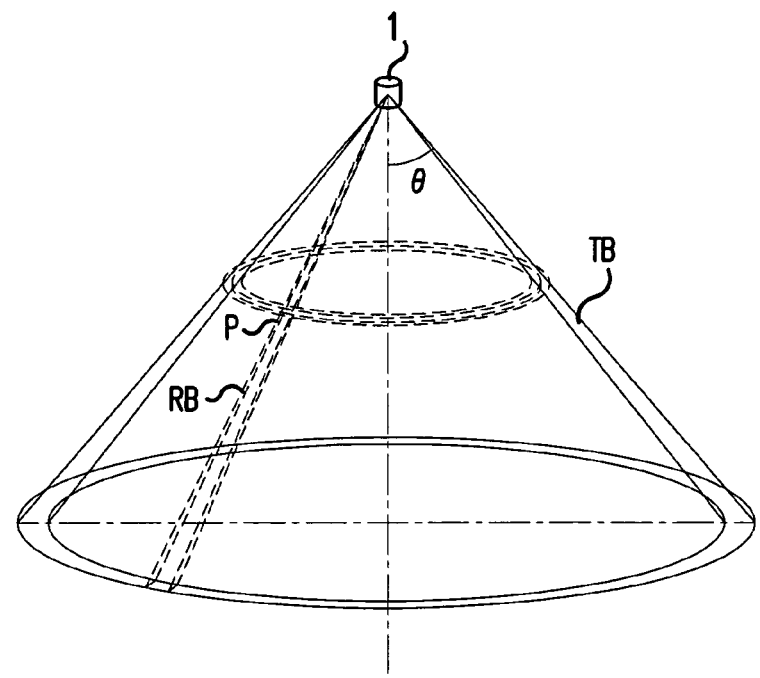
FIG. 4 shows an area to be detected by the above transmitting beam and the receiving beam.

FIG. 4 shows an area to be detected by the above transmitting beam and the receiving beam, where TB represents the umbrella type transmitting beam and RB represents the pencil type receiving beam. If the transducer 1 has transducer elements of 64 columns, a receiving beam RB with resolving power provided by 64 columns in the circumference direction can be formed. As for the distance direction, a detected image data of any area in the transmitting beam TB is sequentially generated at a resolving power defined according to a sampling period of time.

In FIG. 4, detecting in lateral direction can be performed by keeping the transmitting beam being in horizontal direction ($\theta=90°$) or tilted therefrom by a specific angle.

In the example above, a transducer constituted by a cylinder and a plurality of transducer elements arranged thereon is used. In addition, a transducer made of a sphere and a plurality of transducer elements arranged on the whole surface or the portion of the surface can also be used.

Figure 5A:
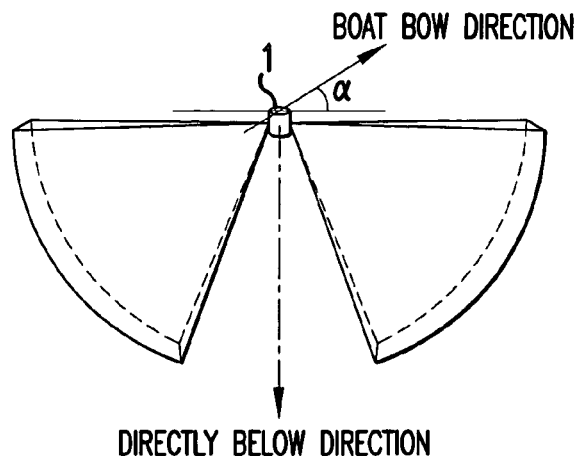
FIG. 5 shows an example of performing detection in a longitudinal direction by using the transducer of FIG. 1.
Figure 5B:
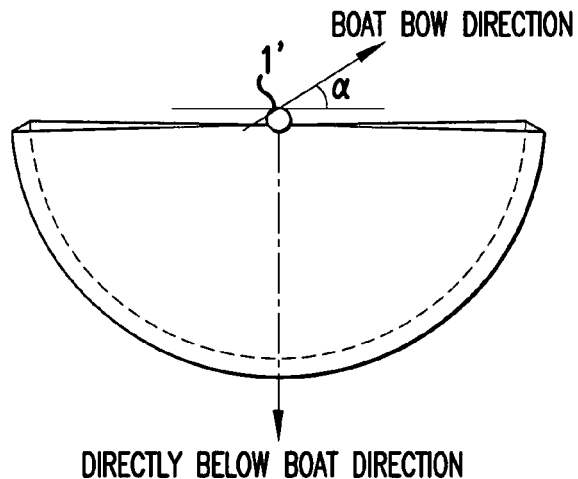
Figure 5C:
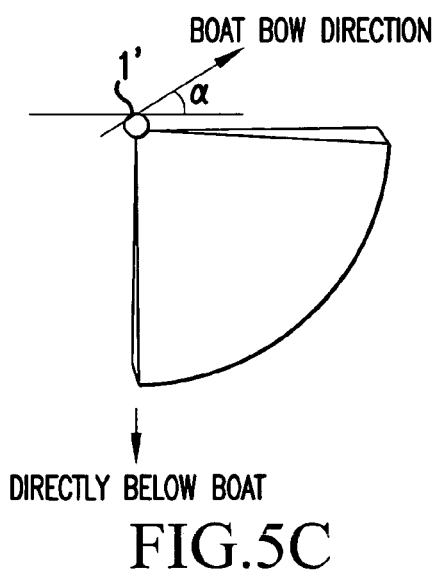

FIG. 5 shows an example of detection in the longitudinal direction by using the above-mentioned transducer. FIG. 5 (A) and FIG. 5 (B) show the detecting area in vertical plane having a bearing angle $\alpha$ with respect to the boat bow direction indicated by arrow. FIG. 5 (A) shows an example where a cylinder type transducer 1 is used. FIG. 5 (B) and FIG. 5 (C) show an example where a sphere type transducer 1' is used.

In detecting in longitudinal direction, an area of sector form expanded in longitudinal direction is to be detected. When cylinder type transducer 1 is used, however, the area directly below the boat is not to be detected since it is impossible to form transmitting/receiving beam in directly-below direction. FIG. 5 (C) shows an example using a spherical shape transducer 1' which can detect the range of 90° from directly-below direction to horizontal direction.

Thus as in FIG. 5, detecting in longitudinal direction is performed by forming the transmitting beam expanding in the form of sector in the vertical plane having a bearing angle $\alpha$ and scanning a receiving beam along the sector form by rapidly changing a tilt angle of pencil-type receiving beam sequentially.

Figure 6:
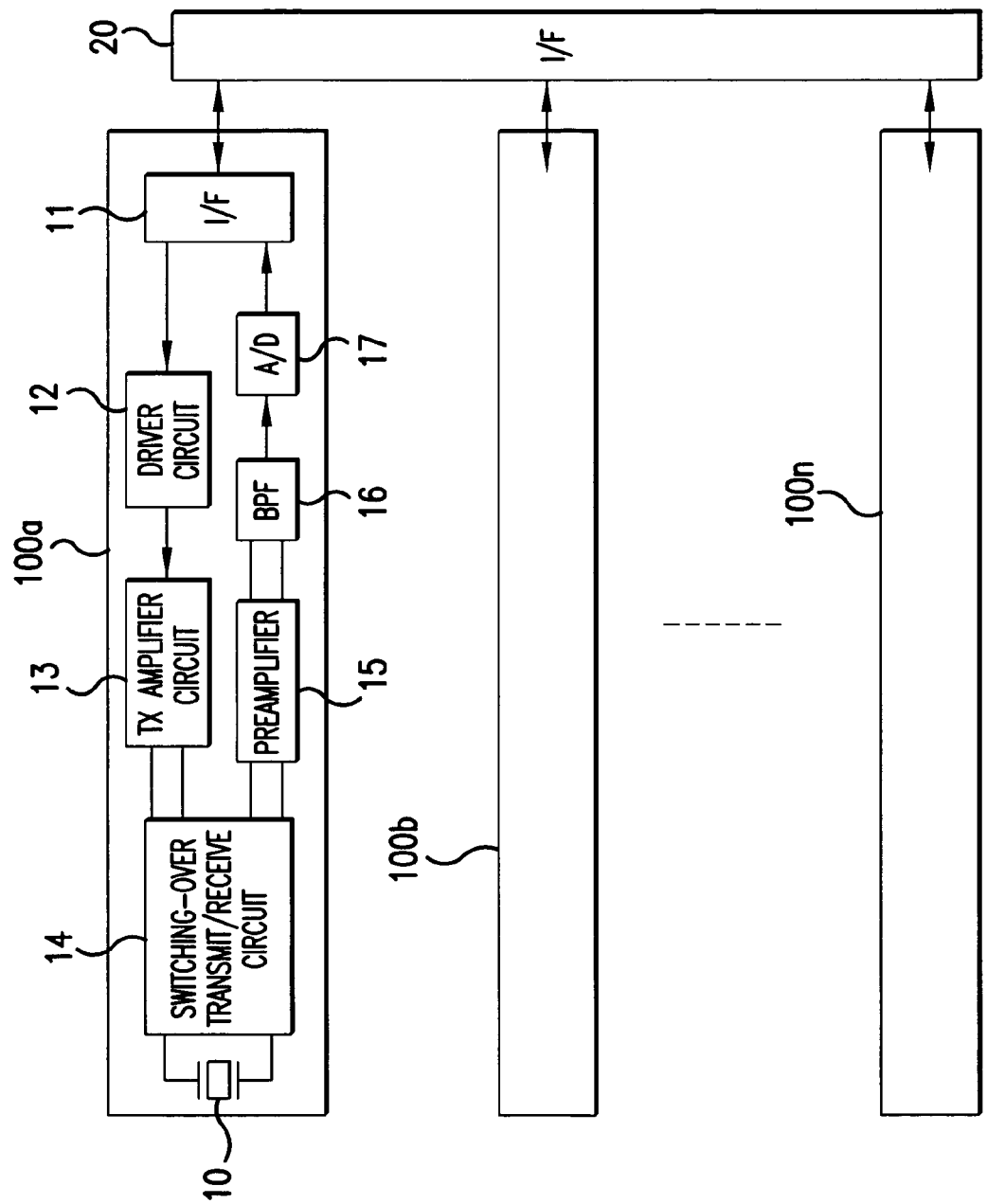
FIG. 6 is a block diagram showing the construction of a transmitting/receiving channel of a scanning sonar.

FIG. 6 is a block diagram showing the construction of transmitting/receiving channel of scanning sonar. A driver circuit 12 converts a binary transmitting signal with pulse-duration modulation, which is provided from a controller (described later), into analog signal via interface 20 and 11. A TX amplifier circuit 13 amplifies the transmitting signal and drives a transducer element 10 via a switching-over transmitting/receiving circuit 14. The switching-over transmitting/receiving circuit 14 guides an output signal from the TX amplifier circuit 13 to the transducer element 10 in a transmitting duration, and guides an output signal of the transducer element 10 as a received signal to a preamplifier 15 in a receiving duration. The preamplifier 15 amplifies the received signal and a band-pass filter 16 eliminates noise components other than a frequency band of received signal. An A/D converter 17 samples the signal of frequency band of received signal at predetermined sampling rate to convert into digital data row.

Above-mentioned parts constitute a transmitting/receiving channel 100. The number of the transmitting/receiving channel 100 installed is the same as the number of the transducer element 10 as shown in $100_a$, $100_b$, ... $100_n$.

Figure 7:
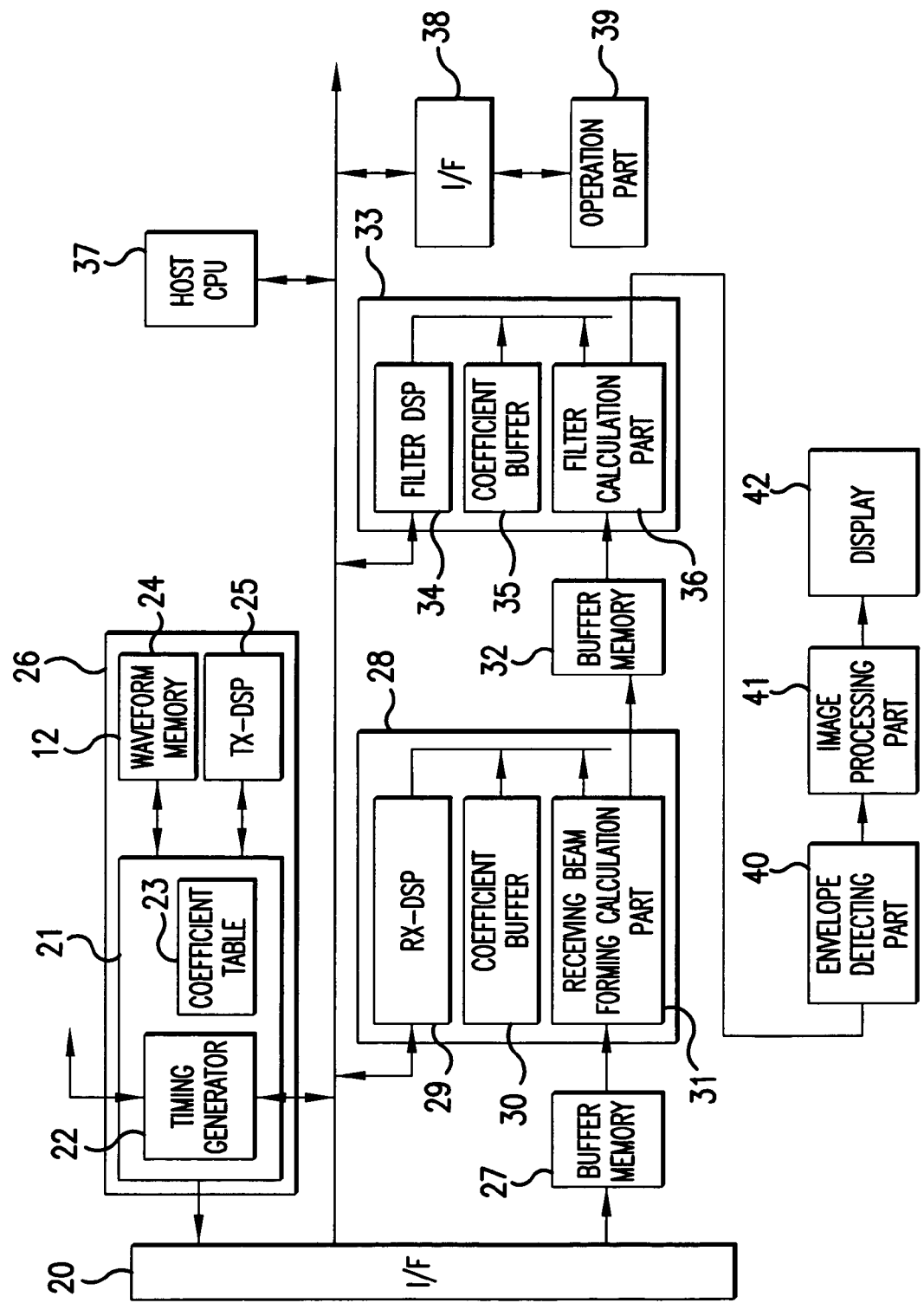
FIG. 7 is a block diagram illustrating the formation of a transmitting/receiving beam using a plurality of the transmitting/receiving channels shown in FIG. 6.

FIG. 7 is a block diagram for forming transmitting/receiving beam using a plurality of the transmitting/receiving channel 100 shown in FIG. 6 and generating a detected image of specific area to be detected. An interface 20 in FIG. 7 represents an interface 20 shown in FIG. 6. In FIG. 7, a programmable transmitting beam forming controller 26 includes a transmitting signal generating circuit 21, a waveform memory 24 and a TX-DSP25. The transmitting signal generating circuit 21 includes a timing generator 22 and a coefficient table 23. The transmitting signal generating circuit 21 is constituted by FPGA (Field Programmable Gate Array). The timing generator 22 generates a signal which is to be a base for timing of generating the transmitting signal. The coefficient table 23 stores an amount of delay and a weight to be provided to each channel of transducer elements, which are calculated by TX-DSP25. The waveform memory 24 is a temporary storage of a waveform to be a base of transmitting signal. The TX-DSP25 is a transmitting signal generating DSP (Digital Signal Processor), which generates binary data of waveform with pulse-duration modulation and send the data to the waveform memory 24. The TX-DSP25 also calculates a content of the coefficient table 23 at every transmitting and update the data. The transmitting signal generating circuit 21 reads out the waveform from the waveform memory 24, refers to the coefficient table 23, feeds binary transmitting signal with pulse-duration modulation into the transmitting/receiving channel 100 via interface 20.

A buffer memory 27 is a memory for temporary storage of received data from each channel via interface 20. A programmable receiving beam forming controller 28 includes an RX-DSP29, a coefficient table 30 and a receiving beam forming calculation part 31. RX-DSP29 calculates a phase and a weight for received signal of each transducer element at every receiving beam and stores the results in the coefficient table 30. The receiving beam forming calculation part 31 calculates a combined received signal by combining the calculated phase and weight from the coefficient table with respect to a received signal of each transducer element. The combined received signals are obtained for each beam to form timeline data and stored in the buffer memory 32. The receiving beam forming calculation part 31 is constituted by FPGA.

In the example described above, the receiving beam is formed in specific direction by performing a phase control with respect to the signal received by the plurality of transducer elements. Delay method using delaying circuit for delaying a signal of each element can be used for the same purpose. A matched filter method can also be used for controlling the direction of receiving beam by providing a Doppler shift to received signal in advance and applying a matched filter to the received signal.

A programmable filter 33 includes a filter DSP 34, a coefficient table 35 and a filter calculation part 36 constituted by FPGA. The filter DSP 34 calculates a filter coefficient to obtain a specific passing band filter property and stores the coefficient in the coefficient table 35. The filter calculation part 36 functions as FIR (Finite Impulse Response) filter based on the coefficient of the table 35 to obtain a band-processed received signal.

An envelope detecting part 40 is for detecting a envelope of band-processed received signal of each receiving beam. Precisely the envelope is detected by calculating a square root of the sum of the square of real part and the square of imaginary part in a time waveform.

An imaging processing part 41 send an imaging data of intensity of received signal at each distance with respect to each receiving beam to a display 42 where a detected image of specific area is displayed.

An operation part 39 is for inputting instructions such as tilt angle for the area to be detected. Host CPU 37 reads out the instructions from the operation part 39 via interface 38 to control above-mentioned parts.

Figure 8:
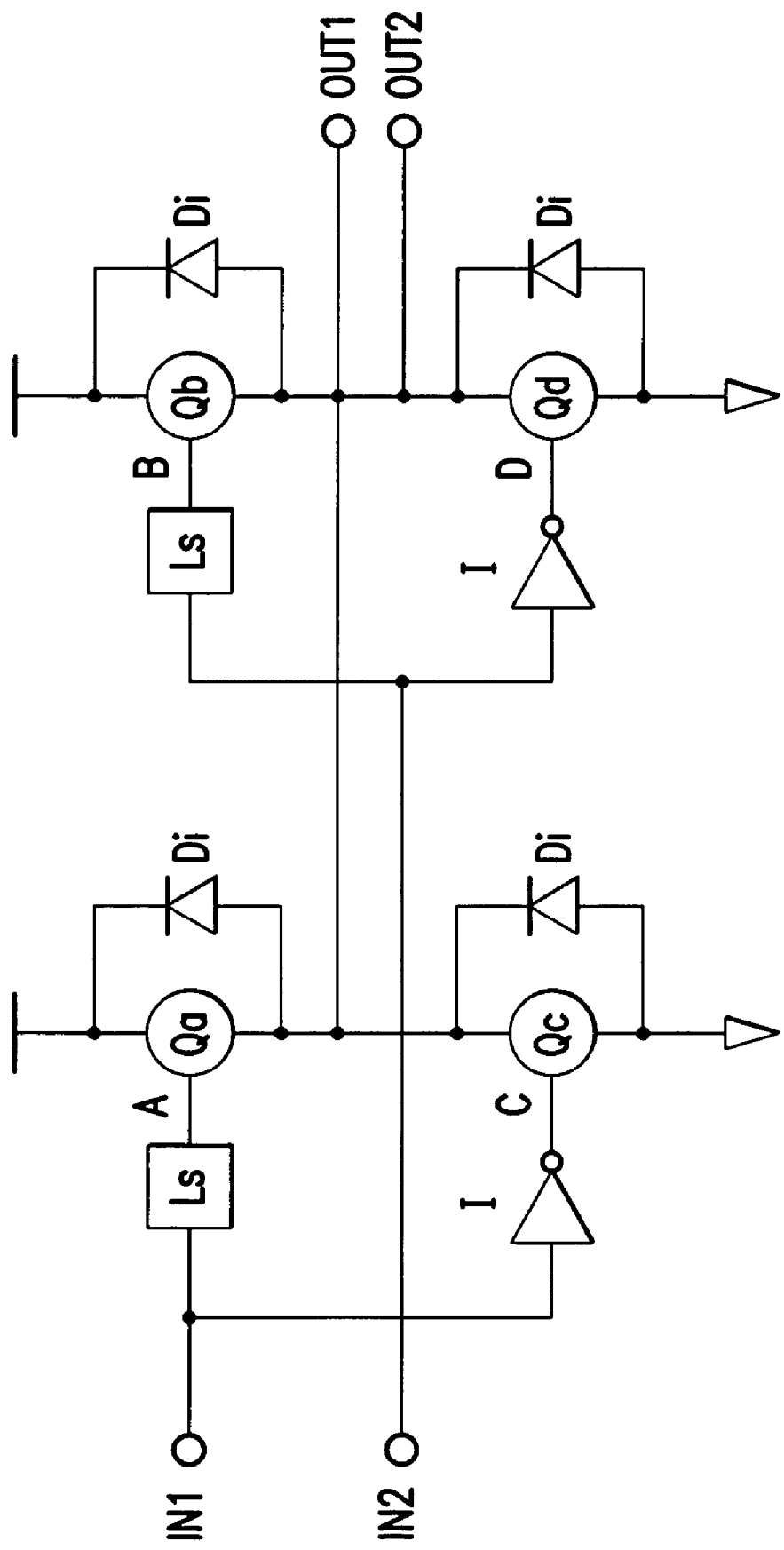
FIG. 8 is a circuit diagram of the driver circuit shown in FIG. 6.
Figure 9:
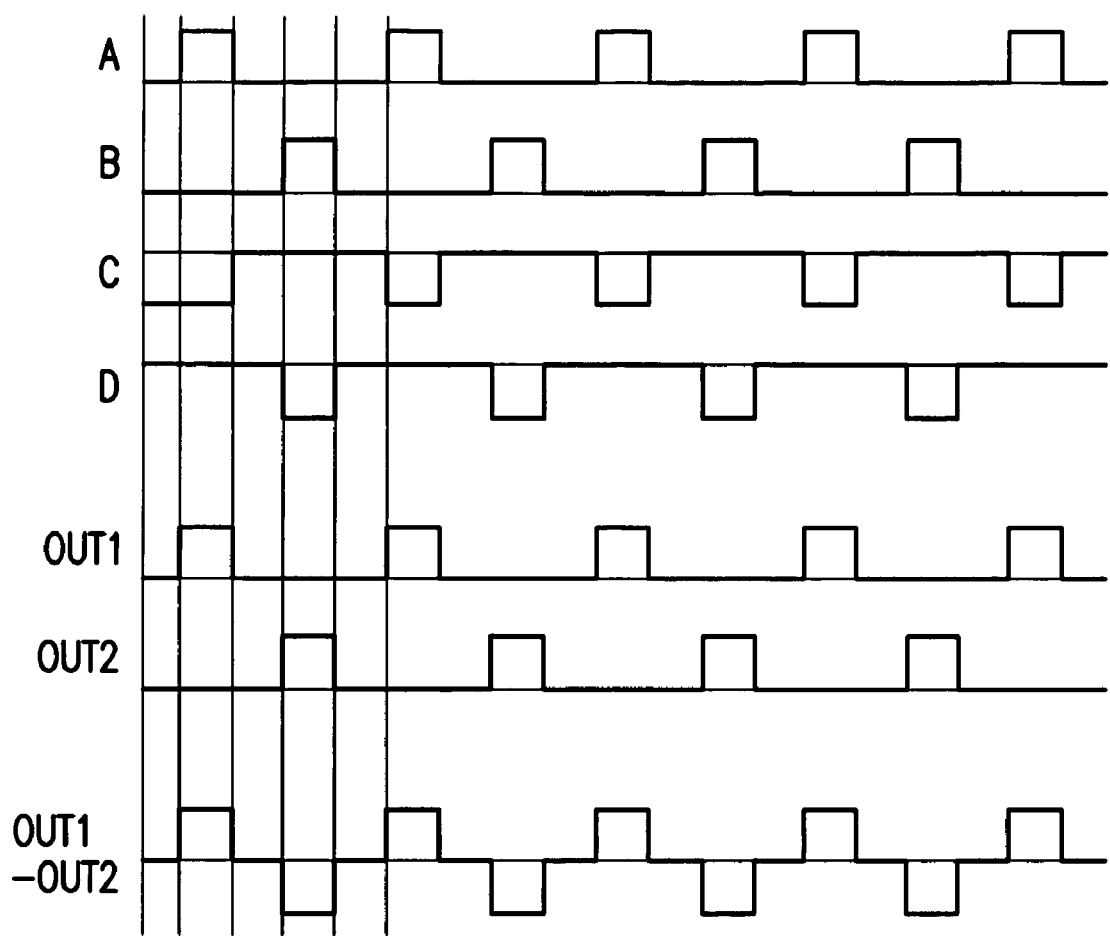
FIG. 9 shows a plurality of waveforms.
Figure 9:
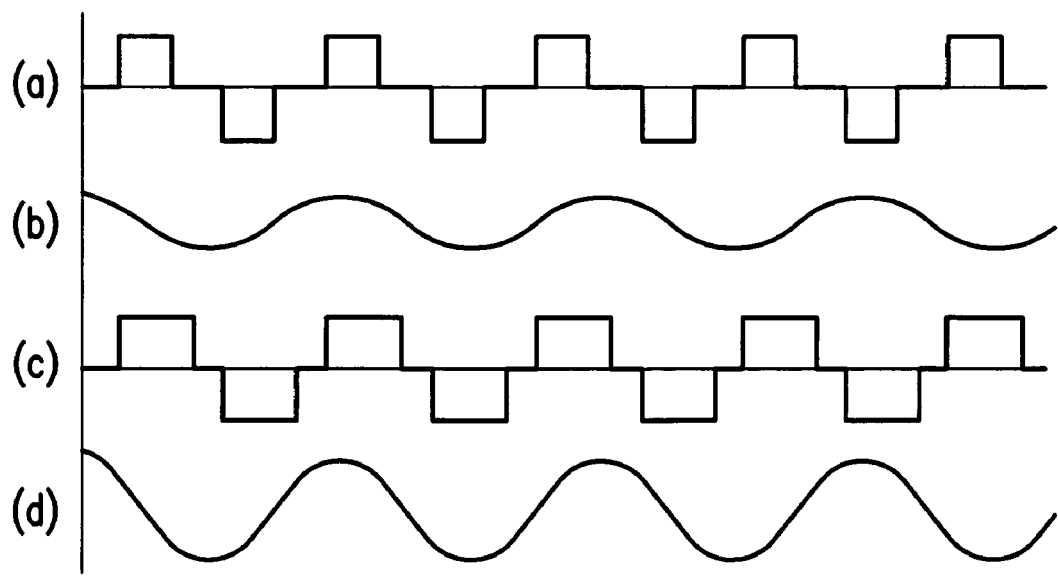

FIG. 8 is a circuit showing the driver circuit shown in FIG. 6. FIG. 9 shows waveforms of each of the parts. In FIG. 8, $Q_a$ $Q_b$ $Q_c$ and $Q_d$ represent MOS transistor respectively, Ls is a level shift circuit for outputting a gate voltage with specific level to the gate of transistors Qa and Qb, I represents an inverter circuit (NOT gate) for outputting a gate voltage to the gate of transistors Qc and Qd. Di represents is a diode to absorb surge voltage generated between drain and source when each of transistor Qa, Qb, Qc and Qd is turned off.

In FIG. 8, When a rectangular wave is input to IN1, IN2, voltage signal at each point A, B, C or D is shown in FIG. 9. When signal at A, B, C or D is high level, transistor Q of which gate voltage corresponding to the high level is turned ON and When signal at A, B, C or D is low level, transistor Q of which gate voltage corresponding to the low level is turned OFF. Consequently output terminals OUT1 and OUT2 show the voltage indicated in FIG. 9. The balance of the two output voltages (OUT1-OUT2) is obtained as an output signal.

When on-duty ratio of input signals IN1 and IN2 is large, duration when transistor Qa and Qb is ON becomes longer, which leads to a longer period of time when (OUT1-OUT2) is positive or negative, in other words not zero. This causes demodulation of pulse-duration modulation to be made.

In FIG. 9, (a), (b), (c) and (d) show the relationship between output waveform of (OUT1-OUT2) and smoothed waveform thereof.

FIG. 9(*a*) shows the waveform of (OUT1-OUT2) and FIG. 9(*b*) shows smoothed waveform thereof. FIG. 9(*c*) shows the waveform of (OUT1-OUT2) and FIG. 9(*d*) shows smoothed waveform thereof. Thus, sine wave signal of which amplitude is in proportion to the on-duty ratio of input signal, IN1 and IN2 is obtained.

Figure 10:
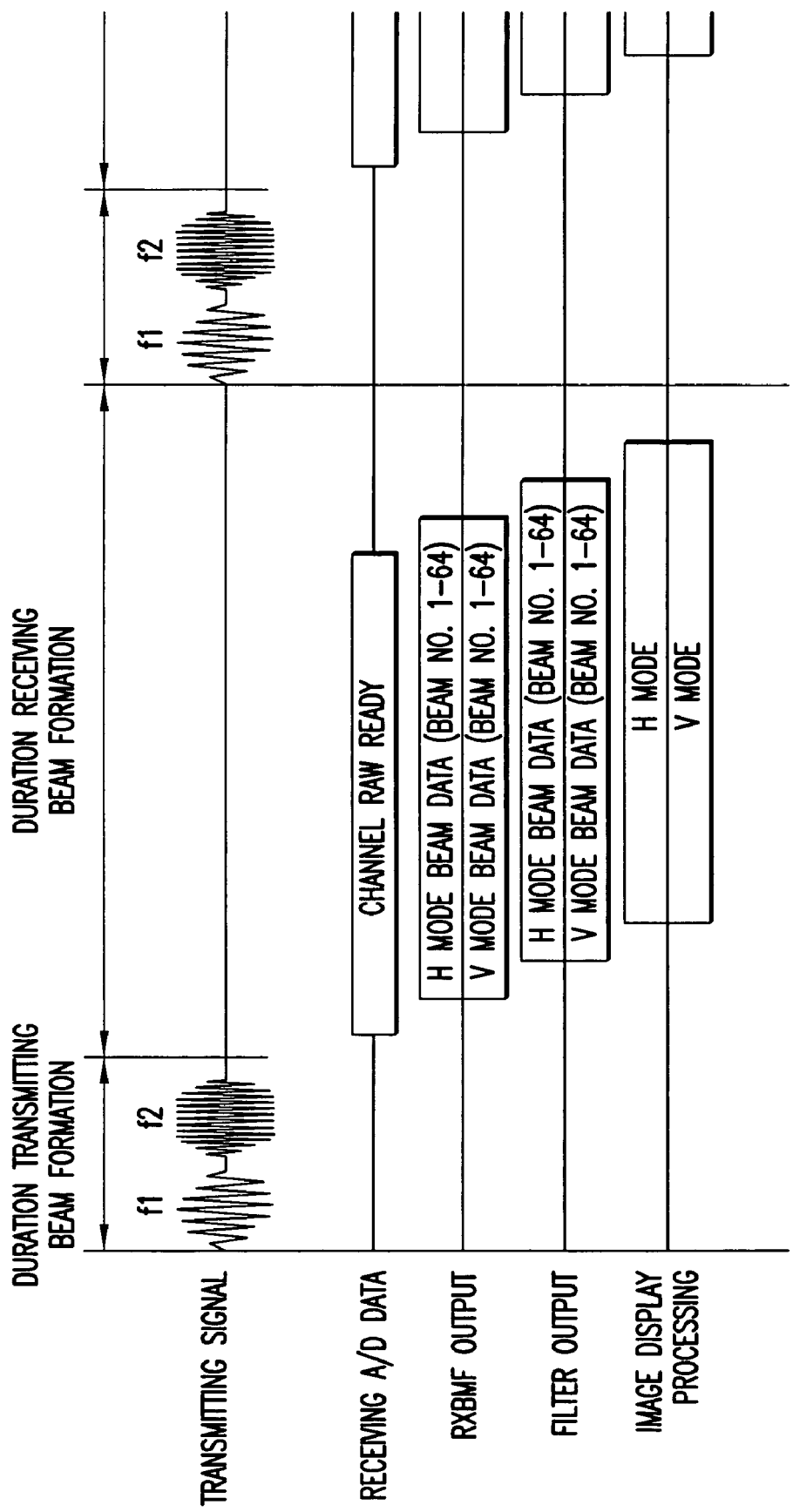
FIG. 10 shows a timing chart with respect to detecting operation by scanning sonar.

FIG. 10 shows a timing chart with respect to detecting operation by scanning sonar. Transmitting signal in FIG. 10 shows representative of driving waveform (transmitting signal) which is provided to one of a plurality of transducer elements. In this example, a transmitting signal with frequency f1 (e.g. 23 kHz) is used for horizontal mode and a transmitting signal with frequency f2 (e.g. 25 kHz) is used for V mode. These two kinds of transmitting signals are transmitted alternatively during transmitting beam formation.

Received A/D data is a timeline data converted by the A/D converter shown in FIG. 6. The timeline data from each channel are processed during receiving beam formation. RXBMF output provides a receiving beam of H mode for detecting in lateral direction and a receiving beam of V mode for detecting in longitudinal direction through the processing by the programmable receiving beam forming controller 28 shown in FIG. 7. In the case where the programmable receiving beam forming controller 28 is capable of forming 128 receiving beams, 64 beams is used for H mode where the 64 beams are formed in all surrounding direction (full-circle) and the rest 64 beams is used for V mode where the 64 beams are formed within a specific angle range.

Filter output is for filtering each receiving beam depending on the frequency used for H mode and V mode, i.e., frequency components having a specific bandwidth of which center value is 23 kHz is extracted for H mode receiving beam and frequency components having a specific bandwidth of which center value is 25 kHz is extracted for V mode receiving beam.

In image display processing, an envelope is detected from the receiving beams for both H mode and V mode by the envelope detecting part 40 shown in FIG. 7 and image data of H mode and V mode are generated at imaging processing part 41 to be displayed on a display 42.

Above-described duration of transmitting beam formation and subsequent duration of receiving beam formation is repeated as a sequence. The transmitting signal represented by f1 for H mode and the transmitting signal represented by f2 for V mode are different in transmitting timing, the compensation for the time difference is made at image display processing for H mode and V mode.

Figure 11:
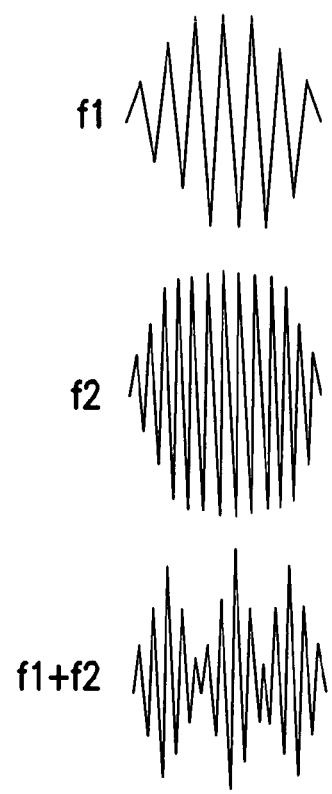
FIG. 11 shows the transmission of signals for forming a transmitting beam both in lateral direction and in a longitudinal direction.

In the above-described example, two kinds of transmitting signal for forming the transmitting beam is transmitted with time-sharing during transmitting beam formation. However those two kinds of signal can be transmitted at the same time. FIG. shows an example of that case. In FIG. 11, f1 and f2 are transmitting signals for forming transmitting beam both in lateral direction and in longitudinal direction respectively. f1+f2 shows the combined signal of both signals as waveform. For example, assuming that f1 is the signal for H mode and f2 is the signal for V mode, one time transmitting of such signal can form the detected images for both H mode and V mode.

In the above-described example, explanation is made about the case where two kinds of modes, i.e., H mode and V mode is used for the detection. It is also possible to perform simultaneous detection about a plurality of cross sections having different tilt angle in H mode.

Figure 12:
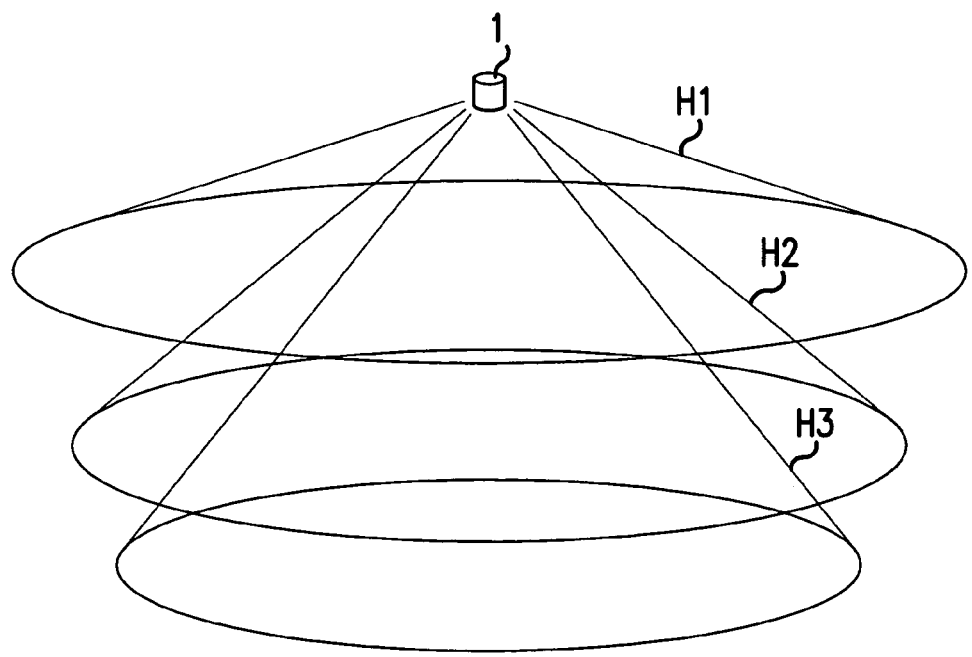
FIG. 12 shows an example of three kinds of transmitting beams in lateral direction each of which has different tilt angle from each other are formed simultaneously.

FIG. 12 shows an example where 3 kinds of transmitting beams in lateral direction each of which has different tilt angle from each other are formed simultaneously. Each of those 3 transmitting beams H1, H2, H3 has different transmitting frequency and frequency components corresponding to the transmitting frequency of H1, H2 and H3 respectively are extracted as received signal at the formation of receiving beam.

As shown in FIG. 10, in the case where transmitting signals with different frequency are sent in time-sharing fashion at every transmitting beam, it requires 3 kinds of tone burst waves having different frequency to be sent sequentially. Also as shown in FIG. 11, in the case of transmitting a combined signal of a plurality of transmitting signal, combined signal of the 3 kinds of tone burst waves having different frequency is to be transmitted. In view of this, 3 cross sections of 3 kinds of transmitting beams can be detected at the same time. Thus the same manner can be applied to 4 or more transmitting beams case.

Figure 13:
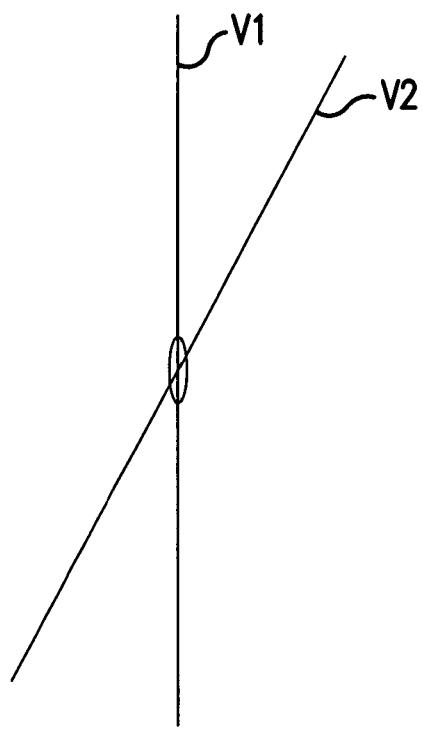
FIG. 13 shows an example of two kinds of transmitting beams having different angle of direction (azimuth) in longitudinal direction are formed simultaneously.

FIG. 13 shows an example where two kinds of transmitting beam having different angle of direction (azimuth) in longitudinal direction are formed simultaneously. These two transmitting beams V1, V2 are different in the transmitting frequency and frequency components corresponding to the transmitting frequency of V1 and V2 respectively are extracted as received signal at the formation of receiving beam.

In view of this, two cross sections of two kinds of transmitting beams in longitudinal direction can be detected at the same time. Thus the same manner can be applied to 3 or more transmitting beams formation case.

Figure 14:
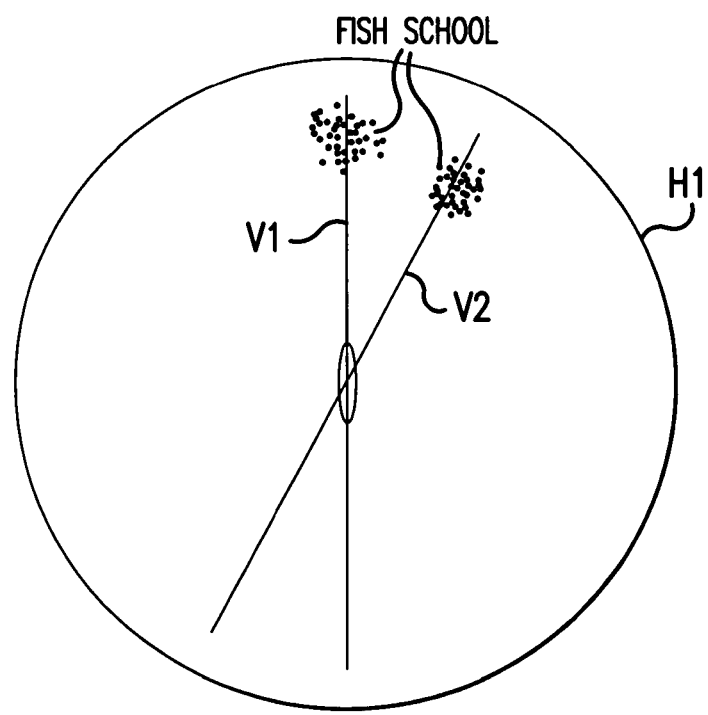
FIG. 14 shows an example of two kinds of transmitting beams V1 and V2 having different angle of direction (azimuth) in longitudinal direction and one transmitting beam H1 in lateral direction are formed simultaneously.

FIG. 14 shows an example where two kinds of transmitting beam V1 and V2 having different angle of direction (azimuth) in longitudinal direction and one transmitting beam H1 in lateral direction are formed simultaneously. Each of those 3 transmitting beams V1, V2 and H1 has different transmitting frequency and frequency components corresponding to the transmitting frequency of V1, V2 and H1 respectively are extracted as received signal at the formation of receiving beam.

In view of this, two cross sections of two kinds of transmitting beams V1, V2 in longitudinal direction and one cross section of one transmitting beam H1 in lateral direction can be detected at the same time. FIG. 14 shows images representing two cross sections in longitudinal direction each of which displays a fish school respectively and an image representing a cross section in lateral direction which displays two fish schools.

Above-described examples are the case where area of transmitting beam spread out to some extent is scanned by a receiving beam to detect the image in the cross section of the transmitting beam. However the present invention is not limited to such transmitting/receiving of ultrasonic signal.

The invention is also effectively applied to the case where transmitting/receiving of ultrasonic signals for measuring a tidal current and detecting a fish school, and for detection in scanning sonar are to be concurrently performed. For example, transmitting/receiving of ultrasonic signals for measuring a tidal current and detecting a fish school, and for detection in scanning sonar can be concurrently performed by using ultrasonic signal with different frequency.

Also the detection of objects can be performed without having any interference while receiving signals from other ultrasonic signal transmitters such as net sonde or net recorder by using ultrasonic signal with different frequency from that other ultrasonic signal transmitters.

Figure 15:
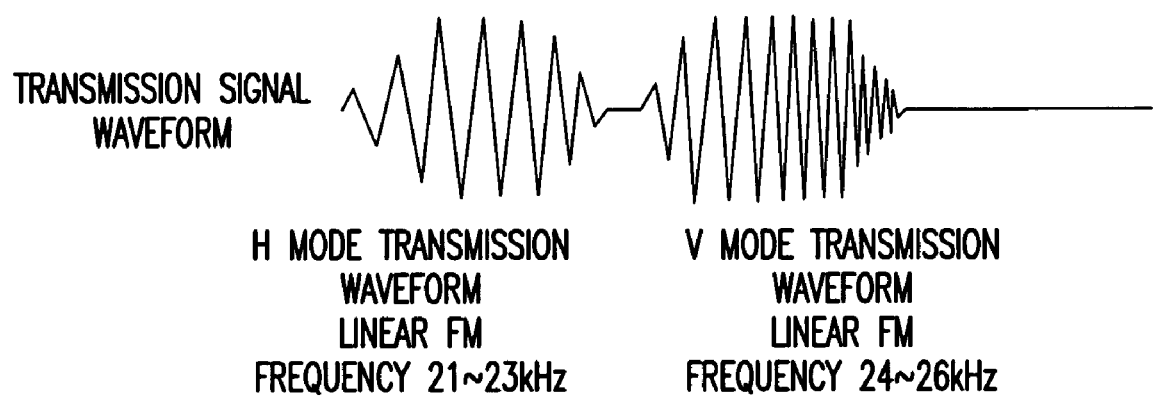
FIG. 15 shows two LFM signals (linear frequency modulated signals) for another embodiment of the invention.

As another embodiment of the invention, two LFM signals (linear frequency modulated signals) shown in FIG. 15 can be used to achieve expected objects in place of transmitting signals in FIG. 10. With this example, a transmitting signal the frequency of which varies linearly from 21 kHz to 23 kHz is used for H mode and a transmitting signal the frequency of which varies linearly from 24 kHz to 26 kHz is used for V mode. In this case, the filter DSP 34 calculates the filter coefficients which are most suitable for each received signals. With the LFM signals and the arrangement therefore used, a pulse compression operation is performed to produce pulse-compressed output signals.

According to various embodiments of the invention, in the case where a plurality of ultrasonic transmitting beams are formed at the same time, a plurality of transmitting signal can be received at the same time without having any interferences. The reason for that is that a transmitting beam forming means forms transmitting beam having different frequency by driving transducer element using different driving frequency depending on the direction, in lateral direction or longitudinal direction, and a receiving beam forming means extracts frequency components corresponding to the transmitting frequency of the transmitting beam respectively as received signal.

According to embodiments of the invention, a transmitting beam forming means forms a transmitting beams simultaneously both in lateral direction and in longitudinal direction. This leads to reducing duration of transmitting beam formation and detection can be performed at short time intervals.

According to embodiments the invention, a transmitting beam forming means forms transmitting beams both in lateral direction and in longitudinal direction by time-sharing during transmitting beam formation, and receiving beam forming means extracts received signals during receiving beam formation following the duration of transmitting beam formation. Therefore the detection both in lateral direction and longitudinal direction can be performed at short time intervals. And yet each transducer element is driven by a single frequency signal, which saves transmitting power and enable detection to reach farther place.

According to embodiments of the invention, the transmitting beam is formed by;
means for generating a waveform of driving signal to be provided to the transducer element as a pulse-duration modulation signal, and means for driving the transducer element by converting the pulse-duration modulation signal into analog signal and amplifying. Therefore the data transmission to the driving circuit for each transducer element becomes easy and noise affection can be reduced. Further the receiving beam is formed by; means for amplifying a received signal received by the transducer element and converting the amplified received signal into digital signal, means for performing a phase control calculation to determine the direction of receiving beam, and means for performing a filter calculation to extract components of the transmitting frequency. Therefore digital signal is obtained for every received signal of each transducer element, which leads to easy transmission of received signal of the each transducer element to a processing part, and yet the phase control and filtering is performed through digital calculation, which prevents a noise much easier.

According to embodiments of the invention, the detected image is displayed. Directions to be detected in the transmitting beams are sequentially scanned by controlling transmitting control means and receiving control means of the ultrasonic transmitting/receiving apparatus, and the detected image data in the detecting area is obtained based on the received signal in each direction and displayed. Therefore detected images in a plurality of detecting directions can be monitored at substantially the same time.

What is claimed is:
1. An ultrasonic apparatus comprising:
a transducer having a plurality of transducer elements;
a controller operatively connected to said transducer and driving the transducer elements to produce a first ultrasonic transmitting beam having a first frequency and a second ultrasonic transmitting beam having a second frequency; and
a processor operatively connected to said transducer for forming and moving reception beams to receive echo signals and extracting frequency components corresponding to said first ultrasonic transmitting beam and said second ultrasonic transmitting beam;
wherein the controller includes
a pulse-duration modulation signal generator for providing a driving signal waveform to the transducer ele- ment, and a converter for converting the pulse-duration modulation signal into an analog signal and amplifying the signal; and the processor includes an amplifier for amplifying a received signal received by the transducer element and converting the amplified received signal into digital signal, a processor performing a phase control calculation to determine the direction of the received signal, and a filter for extracting components of the transmitting frequency.

2. An ultrasonic apparatus according to claim 1, wherein the first transmitting beam and the second transmitting beam are formed simultaneously.

3. An ultrasonic apparatus according to claim 1, wherein the controller forms the first transmitting beam and the second transmitting beam by time-sharing, and the processor extracts reception signals caught by the reception beams after the first and second transmitting beams are transmitted.

4. An ultrasonic apparatus according to claim 1, wherein the first transmitting beam has a first lateral tilt angle and the second transmitting beam has a second lateral tilt angle.

5. An ultrasonic apparatus according to claim 1, wherein said first transmitting beam is transmitted in a lateral direction and the second transmitting beam is transmitted in a vertical direction.

6. An ultrasonic apparatus according to claim 5, including a third transmitting beam transmitted in the lateral direction or a fourth transmitting beam transmitted in a vertical direction.

7. An ultrasonic transmitting/receiving apparatus for detecting objects in lateral direction or longitudinal direction comprising:

a transducer having a plurality of transducer elements;

a transmitting beam former for forming ultrasonic transmitting beams in a plurality of directions in lateral direction or in longitudinal direction by driving a plurality of groups of transducer elements; and a receiving beam former for forming and moving a receiving beam by controlling a signal received by the plurality of transducer elements for each transmitting beam;

wherein the transducer comprises a cylindrical or spherical surface on which the transducer elements are arranged, the transmitting beam former includes means for generating a pulse-duration modulation signal for providing a driving signal wavefrom to the transducer element, and means for driving the transducer element by converting the pulse-duration modulation signal into a analog signal and amplifying the signal;

the transmitting beam former forms transmitting beams of specific transmitting frequency at every transmitting beam by driving the transducer elements with detection signals having different frequencies respectively;

the receiving beam former includes means for amplifying a received signal received by the transducer element and converting the amplified received signal into a digital signal, means for performing a phase control calculation to determine the direction of the receiving beam, and means for performing a filter calculation to extract components of the transmitting frequency.

* * * * *